March 31, 1931.  F. W. GAY  1,798,598
INDUCTION MOTOR
Filed June 30, 1928   3 Sheets-Sheet 1
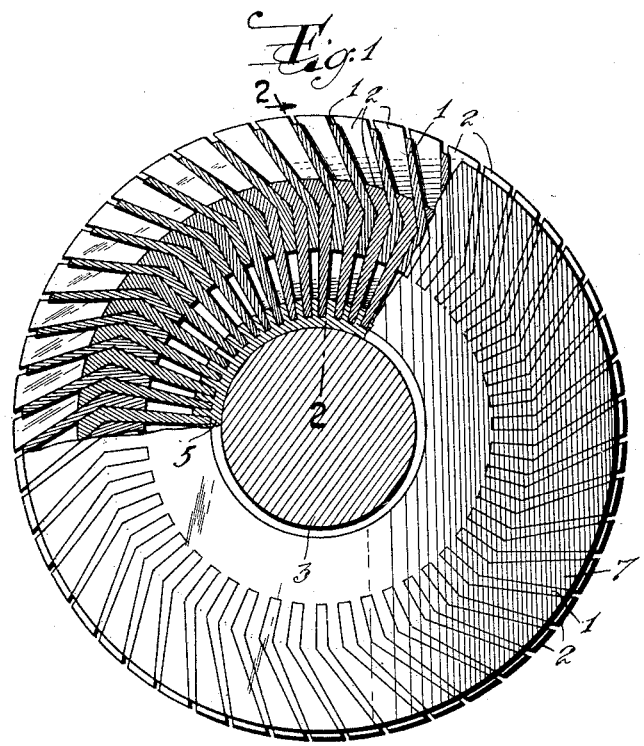
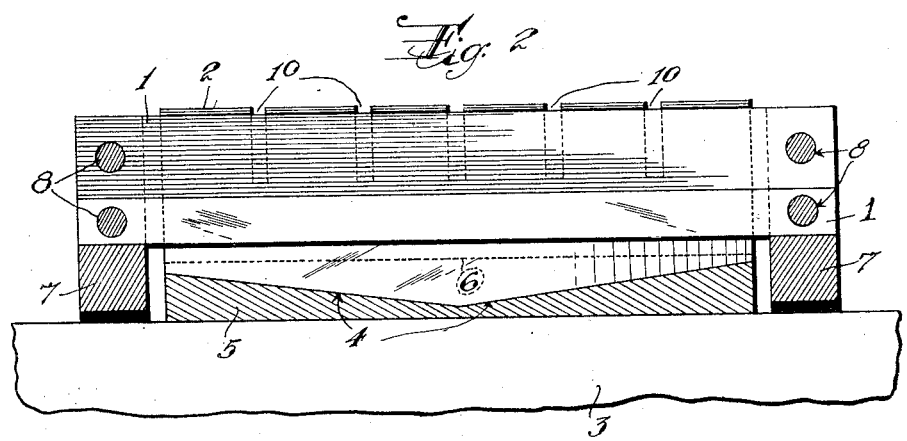
INVENTOR
Frazer W. Gay
BY
Everett W. Cook,
ATTORNEYS March 31, 1931.　　F. W. GAY　　1,798,598
INDUCTION MOTOR
Filed June 30, 1928　　3 Sheets-Sheet 2

INVENTOR
Frazer W. Gay,
BY
ATTORNEYS

March 31, 1931.  F. W. GAY  1,798,598
INDUCTION MOTOR
Filed June 30, 1928  3 Sheets-Sheet 3

INVENTOR
Frazer W. Gay,
BY
Everett Cook,
ATTORNEYS

Patented Mar. 31, 1931

1,798,598

UNITED STATES PATENT OFFICE

FRAZER W. GAY, OF NEWARK, NEW JERSEY

INDUCTION MOTOR

Application filed June 30, 1928. Serial No. 289,374.

This invention relates in general to induction motors, and more particularly to a novel and improved construction for the rotors and the stators of such motors.

According to common practice the rotors of induction motors are made of steel punchings, that is, sheets of steel which are punched out into the desired shape and are clamped together on the shaft between end rings in a laminated formation. The stators of induction motors are similarly made and include coils which are wound upon forms and fitted into the grooves provided by the laminated core composed of the steel punchings. Such motors are commonly called squirrel-cage induction motors, and the demand for such motors which shall be operable without a compensator and which have extremely high starting torque and require low starting current, normally necessitates the use of several different forms of rotor punchings for each size of motor i. e., a different form of punching for each operating characteristic desired.

The use of steel punchings for such motors has many disadvantages, the greatest of which is that the dies and tools required to make the punchings are expensive, and even where the production of a given style of punching is great, the tools and dies wear out quickly so that the total cost of producing a single motor is large. This disadvantage leads to another, that is, it tends to retard or prevent the making of minor improvements in the design, since the cost of the required dies and tools necessary for making such improvements is relatively too great; and accordingly motors as now built do not generally approximate the most desirable construction. Furthermore delays in manufacture are frequent due to broken or damaged dies, which delays are often extremely serious for small companies having only one die. Another disadvantage of the present practice is that part of the steel which is punched out in making the laminations for the rotors or stators can be used only for scrap. Difficulty is also encountered in providing satisfactory means for holding the laminations upon a finished shaft.

One object of my invention is to overcome all of the foregoing disadvantages by constructing the rotor or the stator of induction motors of the general character described of alternately disposed conducting bars and magnetic bars which can be easily and conveniently assembled and securely attached to a finished shaft.

Another object is to provide a rotor and a stator for induction motors constructed of drawn or rolled copper bars and drawn or rolled steel bars which are welded to a steel shaft.

Other objects are to provide an induction motor rotor composed of low resistance bars alternately arranged with high permeability bars which are so shaped that each bar is keyed or locked to its adjacent bars whereby to overcome the influence of centrifugal force developed by rotation of the rotor; to provide a rotor of the character described which is secured to the shaft by cast welding a magnetic material between the bars and the shaft; to provide such a rotor wherein the low resistance bars have a high resistance portion adjacent the periphery of the rotor and low resistance portions relatively remote from the periphery; to provide an induction motor rotor of this character having end rings cast welded upon the ends of the low resistance bars; to provide a stator for an induction motor consisting of alternately arranged drawn steel bars and drawn copper bars and novel and improved means for mounting said bars in a frame, and to obtain other advantages and results as will be brought out by the following description.

Referring to the accompanying drawings, in which corresponding and like parts are designated throughout the several views by the same reference characters—

Figure 1 is an end elevation of a rotor embodying my invention with portions of the end ring broken away for clearness in illustration.

Figure 2 is a longitudinal vertical sectional view taken on the line 2—2 of Figure 1.

Figure 3:
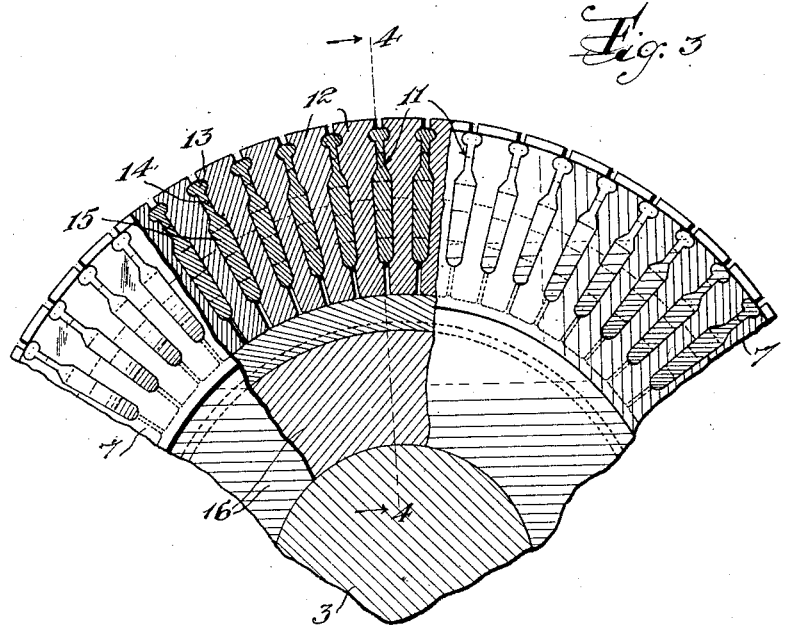
Figure 3 is a fragmentary end elevation of a modified form of rotor, portions of the end ring being broken away.

Specifically describing the embodiment of the invention illustrated in Figures 1 and 2, the reference characters 1 designate drawn copper bars which are arranged in alternate relation with drawn steel bars 2, said bars being in general wedge-shaped or tapered to compensate for the radial arrangement thereof, and being angular in transverse section so as to mutually interlock or have a keyed relation with each other. These bars are assembled in a clamp ring and forced radially inwardly under a pressure of several tons, after which the inner edges of the steel bars are welded to the central revolving member or shaft 3. Preferably the inner edges of the steel bars incline from opposite ends toward the center as indicated at 4 to provide a longitudinally interlocking relation with the welding portion 5 which is welded to both the steel bars and the shaft 3. The thickness of the welded body between the steel bars is designated by the dotted line 6 on Figure 2 of the drawings. All parts are held in a suitable jig during the welding operation, and it will be observed that the inclined inner edges of the steel bars facilitate the welding. The ends of the copper bars 1 project beyond the ends of the steel bars as shown in Figure 2 of the drawings, and have cast welded thereon conducting end rings 7. Said ends of the copper bars are preferably provided with transverse openings 8 which provide a more secure bonding of the end rings upon the copper bars, the material of the end rings passing through said openings. The peripheral edges of the steel bars are preferably formed with notches 10 which break up or interrupt axial currents during the starting of the motor.

Figure 4:
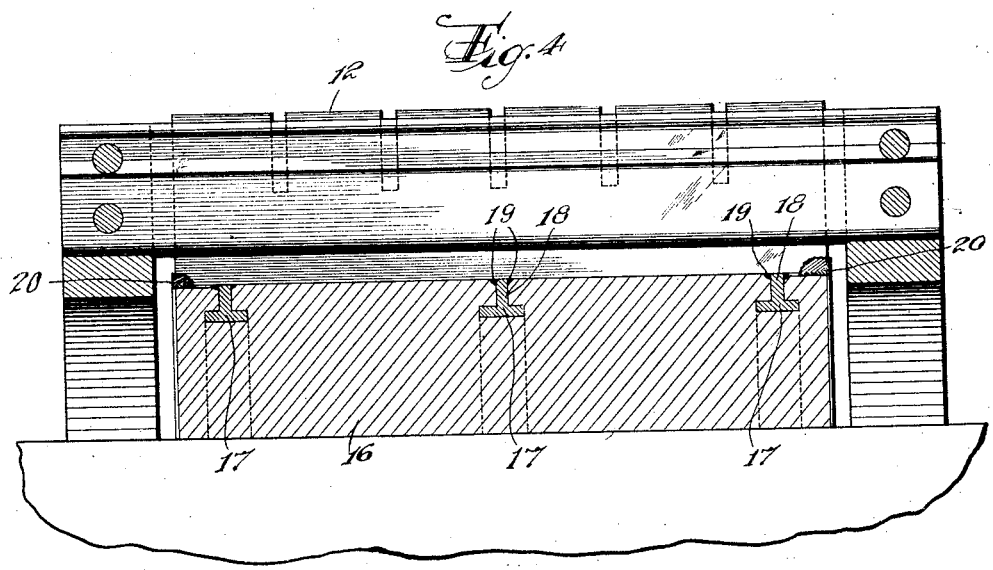
Figure 4 is a vertical longitudinal sectional view on the line 4—4 of Figure 3.

In Figures 3 and 4 of the drawings is shown a rotor construction comprising drawn copper bars 11 and drawn steel bars 12 which are arranged in a manner somewhat similar to the copper bars and micas of a commutator. Adjacent the peripheral or outer edges, the copper bars have a small cross-section 13 and hence a high ohmic resistance and inwardly of said portion 13 the bars have a thin flat section 14 which allows the adjacent magnetic or steel bars 12 to be closely disposed to each other. At their inner edges the copper bars have portions 15 of relatively large cross-section and hence of low resistance. The steel bars 12 are wider than the copper bars, that is, the inner edges of the steel bars extend radially inwardly beyond the inner edges of the copper bars, and accordingly the portions 15 of the copper bars are deeply imbedded in the magnetic material. The steel bars have their sides so shaped as to closely contact with the sides of the copper bars throughout their width, and accordingly all of the bars 11 and 12 are positively locked to each other so that even should they be loose upon the shaft 3, they cannot be dislodged by centrifugal force. Preferably the outer edges of the copper bars terminate short of the periphery of the rotor, that is, approximately one thirty-second of an inch below the finished surface of the rotor so that they are not touched by the turning tool or grinding wheel during the finishing operations. It will be observed that the portions 13 of the copper bars are designed to have a low reactance, while the portions 15 have a high reactance.

For mounting the bars 11 and 12 I cast an iron body 16 on the inner ends of the steel bars and the shaft 3. Preferably a plurality of circumferential rings 17, T-shaped in cross-section are cast in the body 16 with the median flanges 18 extending through the surface of the cast iron body 16 as clearly shown in Figure 4. The inner edges of the steel bars 12 are welded as at 19 to these iron rings 17, and also the outer ends of the steel bars are welded to each other as at 20. The steel bars are thus securely bonded to each other and to the cast iron body.

Figure 5:
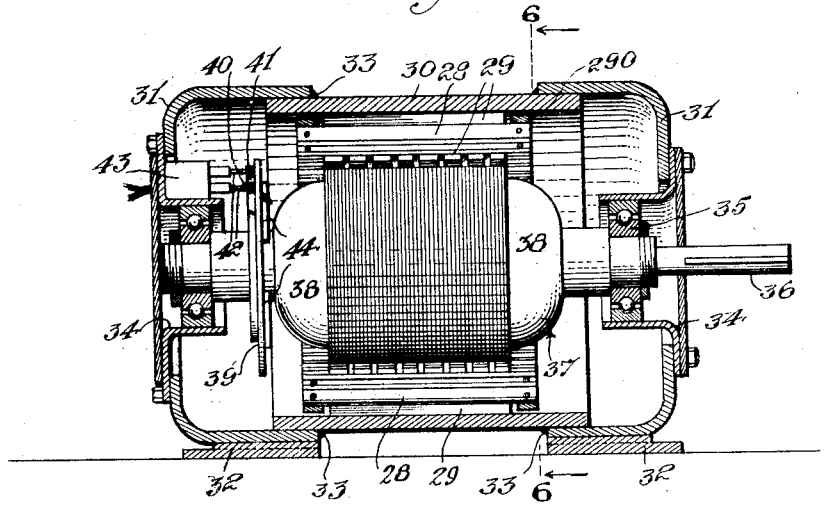
Figure 5 is a vertical longitudinal sectional view through an induction motor having a stator embodying my invention.
Figure 6:
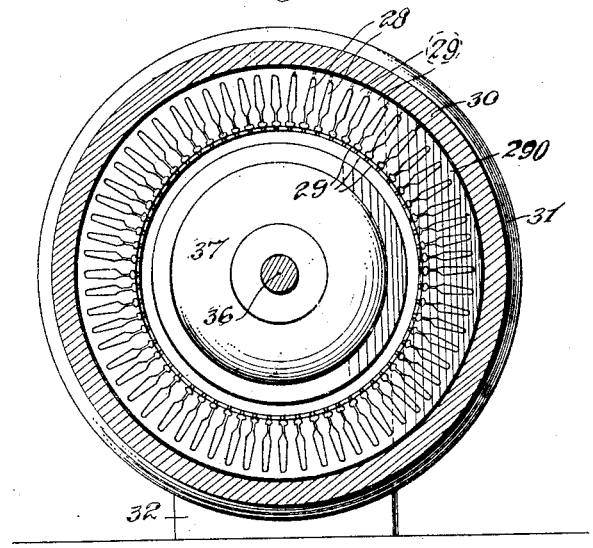
Figure 6 is a transverse vertical sectional view taken on the line 6—6 of Figure 5.

My invention may be embodied in a stator for induction motors as illustrated in Figures 5 and 6. Here the drawn copper bars 28 and drawn steel bars 29 which may be substantially of the same cross-sectional shape as the bars 11 and 12, are clamped together in annular relation, as are the copper bars and micas in a commutator by means of a split pulling-up ring. After the copper bars and steel bars have been assembled and pulled up tight they are pushed into a red hot steel sleeve 30. As this sleeve shrinks upon cooling it pulls tightly against the steel bars and copper bars so that they are firmly secured against movement in the ring and can be turned to size inside by the usual turning and grinding operations. End rings 290 are secured to the ends of the copper bars 29 in the same manner as the end rings 7 are secured to the bars 1. Steel forged end bells 31 having feet 32 welded thereon are shrunk on the ends of the sleeve 30 in a suitable jig and then welded at 33 so that the bells are firmly secured to the ends of the sleeve. The bearing brackets 34 are jig-doweled to the steel bells 31 so that they can be removed and replaced accurately.

Mounted in the bearing brackets 34 are roller bearings 35 of known construction in which is journaled the shaft 36 of any suitable type of rotor 37, for example a wound split phase rotor having the heads 38 of single phase and split phase windings. Upon the shaft 36 is secured an insulating ring 39 which carries two slip rings 40 and 41 with which contact brushes 42 mounted in brushholders 43 which supply single phase electric current to the slip rings 41. Suitable known centrifugal switches 44 are provided for the split phase rotor winding.

Rotors and stators constructed in accordance with my invention entail a small expense for tools, permit efficient use of material, have high starting torque and require low starting current at a high power factor without a compensator, have low slippage and hence high efficiency, can be manufactured at low cost, and the invention makes changes in design a simple matter.

While I have shown rotors and a stator embodying certain details of construction it will be understood that this is primarily for the purpose of illustrating the principles of my invention and that many modifications and changes may be made in the details of construction of the low resistance bars and the high permeability bars, the assembly thereof, and the mounting thereof on the revolving member or shaft, or, in the case of the stator, in the frame of the motor, without departing from the spirit or scope of the invention.

Having thus described my invention, what I claim is:

1. A squirrel cage element for induction motors comprising a body member, conducting bars and magnetic bars annularly arranged in alternate, directly contacting and mutually interlocked relation on said body member, and means electrically connecting said conducting bars.

2. A squirrel cage element for induction motors comprising a magnetic body member, conducting bars and magnetic bars annularly arranged in alternate, directly contacting and mutually interlocked relation, said magnetic bars being directly secured to said magnetic body member, and short-circuiting end rings connecting said conducting bars.

3. A rotor for induction motors comprising a body member, a plurality of drawn conducting metal bars, a plurality of drawn magnetic metal bars, said bars being arranged circumferentially about the body member with alternate bars in directly contacting and mutually interlocked relation, said magnetic bars being directly secured to said body member.

4. A squirrel cage element for induction motors comprising a body member, conducting bars and magnetic bars annularly arranged in alternate relation on said body member, and transverse notches in the outer edges of said magnetic bars and spaced longitudinally thereof.

5. A squirrel cage element for induction motors comprising conducting bars and magnetic bars annularly arranged in alternate relation, transverse notches in the outer edges of said magnetic bars, and means for rigidly holding said bars against the action of centrifugal force.

6. A squirrel cage element for induction motors comprising a body member, conducting bars and magnetic bars annularly arranged in alternate and keyed relation on said body member, and transverse notches in the outer edges of said magnetic bars.

FRAZER W. GAY.